(12) United States Patent
Friedow

(10) Patent No.: US 6,290,306 B1
(45) Date of Patent: Sep. 18, 2001

(54) HYDRAULIC BRAKE SYSTEM FOR A VEHICLE

(75) Inventor: Michael Friedow, Tamm (DE)

(73) Assignee: Robert Bosch GmbH, Stuttgart (DE)

( * ) Notice: Subject to any disclaimer, the term of this patent is extended or adjusted under 35 U.S.C. 154(b) by 0 days.

(21) Appl. No.: 09/269,269

(22) PCT Filed: Aug. 23, 1997

(86) PCT No.: PCT/DE97/01913

§ 371 Date: May 28, 1999

§ 102(e) Date: May 28, 1999

(87) PCT Pub. No.: WO98/13241

PCT Pub. Date: Apr. 2, 1998

(30) Foreign Application Priority Data

Sep. 26, 1996 (DE) .............................................. 196 39 560

(51) Int. Cl.$^7$ ...................................................... B60T 8/34
(52) U.S. Cl. ................................... 303/113.3; 303/116.1; 303/115.4; 303/901; 60/585
(58) Field of Search ............................. 303/113.2, 113.3, 303/115.4, 116.1, 116.2, 10, 11, 901; 137/513.5, 513.3; 60/585, 588, 589, 592

(56) References Cited

U.S. PATENT DOCUMENTS

| | | | |
|---|---|---|---|
| 4,329,846 | * | 5/1982 | Gaiser ................................... 60/562 |
| 4,373,333 | * | 2/1983 | Coleman ................................. 60/578 |
| 4,640,098 | * | 2/1987 | Brademeyer et al. .................. 60/578 |
| 5,362,140 | * | 11/1994 | Burgdorf ............................ 303/113.2 |
| 5,501,514 | * | 3/1996 | Resch et al. ....................... 303/115.4 |
| 5,927,824 | * | 7/1999 | Pahl et al. .......................... 303/113.2 |

* cited by examiner

Primary Examiner—Robert J. Oberleitner
Assistant Examiner—Mariano Sy
(74) Attorney, Agent, or Firm—Ronald E. Greigg; Edwin E. Greigg

(57) ABSTRACT

A hydraulic brake system for a vehicle for braking the vehicle by brake pedal actuation and/or automatic braking. A pump is provided which has a suction connection that communicates with a supply container for a pressure fluid and a pressure connection for aspirating pressure fluid from the supply container and pumping the fluid to a connection of a master cylinder. A brake circuit of the vehicle brake system is connected with vehicle wheels associated with wheel brake cylinders and with valve assemblies for brake pressure modulation and is connected to the connection of the master cylinder. A valve pressure is also provided between a pressure chamber that communicates with the connection of the master cylinder and the supply container for pressure fluid. The pressure valve is actuatable by pump pressure in automatic braking, which at low pump pressure throttles the fluid flow through the pressure chamber of the master cylinder to the supply container and which limits this pressure at pump pressure that is elevated in comparison.

8 Claims, 3 Drawing Sheets

HYDRAULIC BRAKE SYSTEM FOR A VEHICLE

Prior Art

The invention is based on a hydraulic vehicle brake system as set forth hereinafter.

One such hydraulic vehicle brake system is already known (WO A 92/17357), in which a valve assembly is provided in a line between the first pressure chamber of the master cylinder and the supply container: The valve assembly comprises a 2/2-way valve with a parallel-connected pressure limiting valve. The multiway valve upon spring actuation assumes its open position and upon electromagnetic actuation assumes its blocking position. It is switched into the blocking position by the control unit of the brake system when the pump is put into operation for automatic braking. The pressure generated by the pump is operative in the first pressure chamber of the master cylinder and causes the second piston to be displaced, so that the pressure in the second pressure chamber of the master cylinder is increased. Consequently, without pedal actuation, an increased pressure is available in both brake circuits of the brake system; this pressure can be modulated by means of the valve assemblies for brake pressure modulation and fed into at least one wheel brake cylinder. The pressure limiting valve disposed parallel to the multiway valve limits the pump pressure. A disadvantage, however, is the increased complexity of control for the electrical triggering of the 2/2-way valve, and the engineering expense for the multiway valve and pressure limiting valve.

Also in a hydraulic motor vehicle brake system in accordance with German Patent Disclosure DE-A 4 000 836, a valve means is used which in a brake circuit is located between a master cylinder connection and valve assemblies for brake pressure modulation in wheel brake cylinders of driven vehicle wheels. In both its spring-actuated position and its position reinforced by the pressure in the master cylinder, the valve means allows an unhindered flow of pressure fluid. The valve means can be switched by the pressure of a pump, for the sake of automatic braking, into a second position in which the valve means blocks off the flow. The pressure of the pump can then be fed in controlled fashion into the wheel brake cylinders by means of the valve assemblies. To protect the pump, the valve means functions in the second position as a pressure limiting valve.

ADVANTAGES OF THE INVENTION

The hydraulic vehicle brake system has the advantage over the prior art that the valve means can be switched as a function of the level of the pressure generated during pump operation. The control unit of the brake system can therefore be embodied at less effort and expense than in the known state of the art. Finally, the valve means protects the pump against an overload.

By the provisions recited herein, advantageous refinements of and improvements to the hydraulic vehicle brake system are possible.

With the embodiment of the invention defined here in after the hydraulic brake system is further developed into a brake system in which the pump connected to the supply container need merely furnish charge pressure at a low level, in order to supply the high-pressure pumps with pressure fluid so that the high pressure pumps can furnish high pressure to the brake circuits sufficiently quickly in automatic braking operation. This demand made of the pump is advantageous in the sense that an economical embodiment of low capacity can be used for the pump. It is advantageous that the pump, operated at a relatively low pressure level in comparison with the high-pressure pumps, puts only little strain on the master cylinder; that is, for the communication between the master cylinder and the supply container, the usual plug-type connection at the first and third connections of the master cylinder can be used.

Further, versions of the valve means are disclosed, which comprises only a few, easily manufactured components, and then as a component unit can be checked and quickly installed.

BRIEF DESCRIPTION OF THE DRAWINGS

One exemplary embodiment of the hydraulic vehicle brake system of the invention is shown in the drawings and described in further detail below.

DESCRIPTION OF THE EXEMPLARY EMBODIMENT

Figure 1:
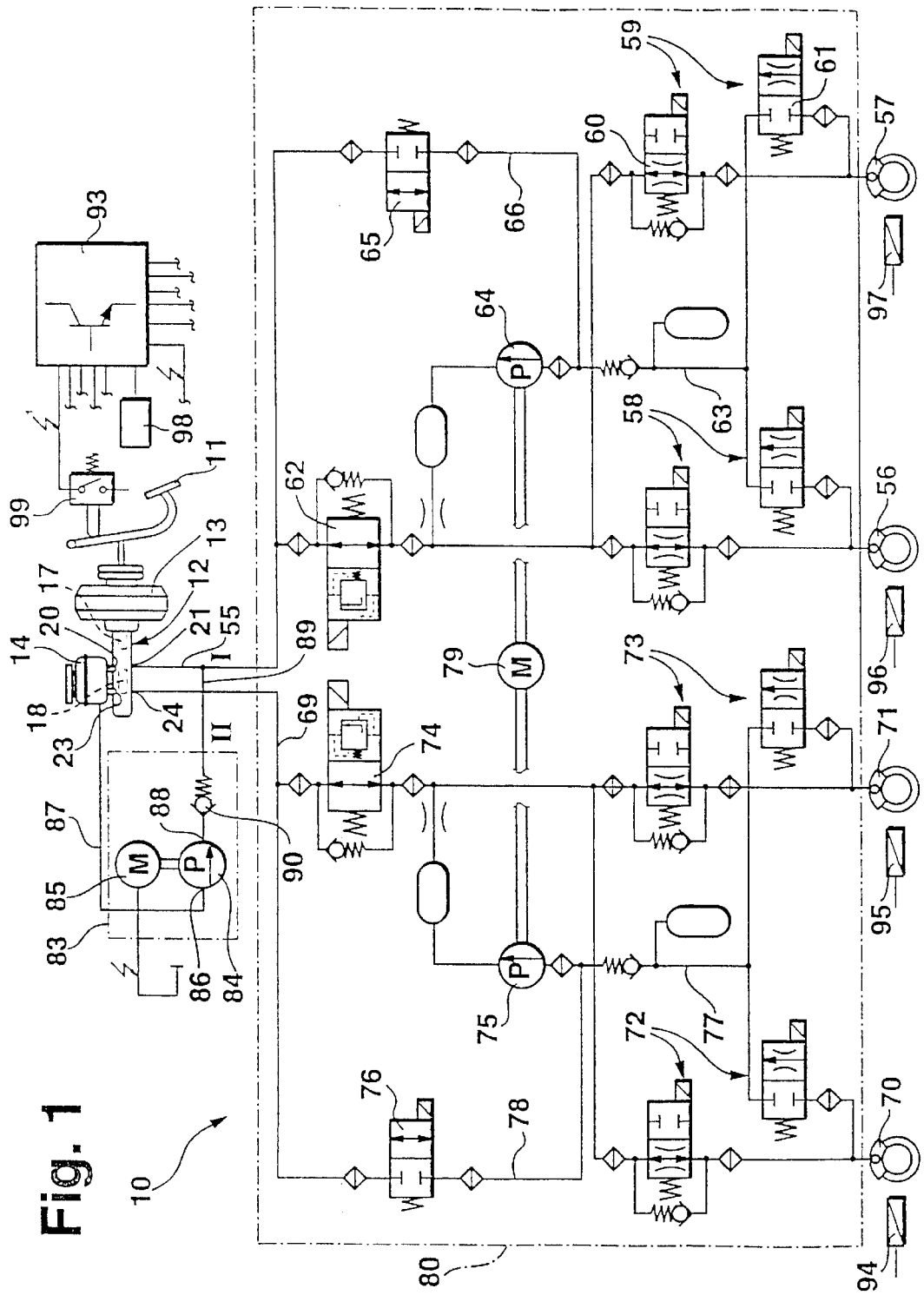
FIG. 1 is a circuit diagram for the vehicle brake system.

A hydraulic vehicle brake system 10 schematically shown in FIG. 1 is intended both for braking by brake pedal actuation and for automatic braking, such as by a dynamic drive control (FDR). It also has an anti-lock system (ABS) and is also further developed for traction control (ASR).

Figure 2:
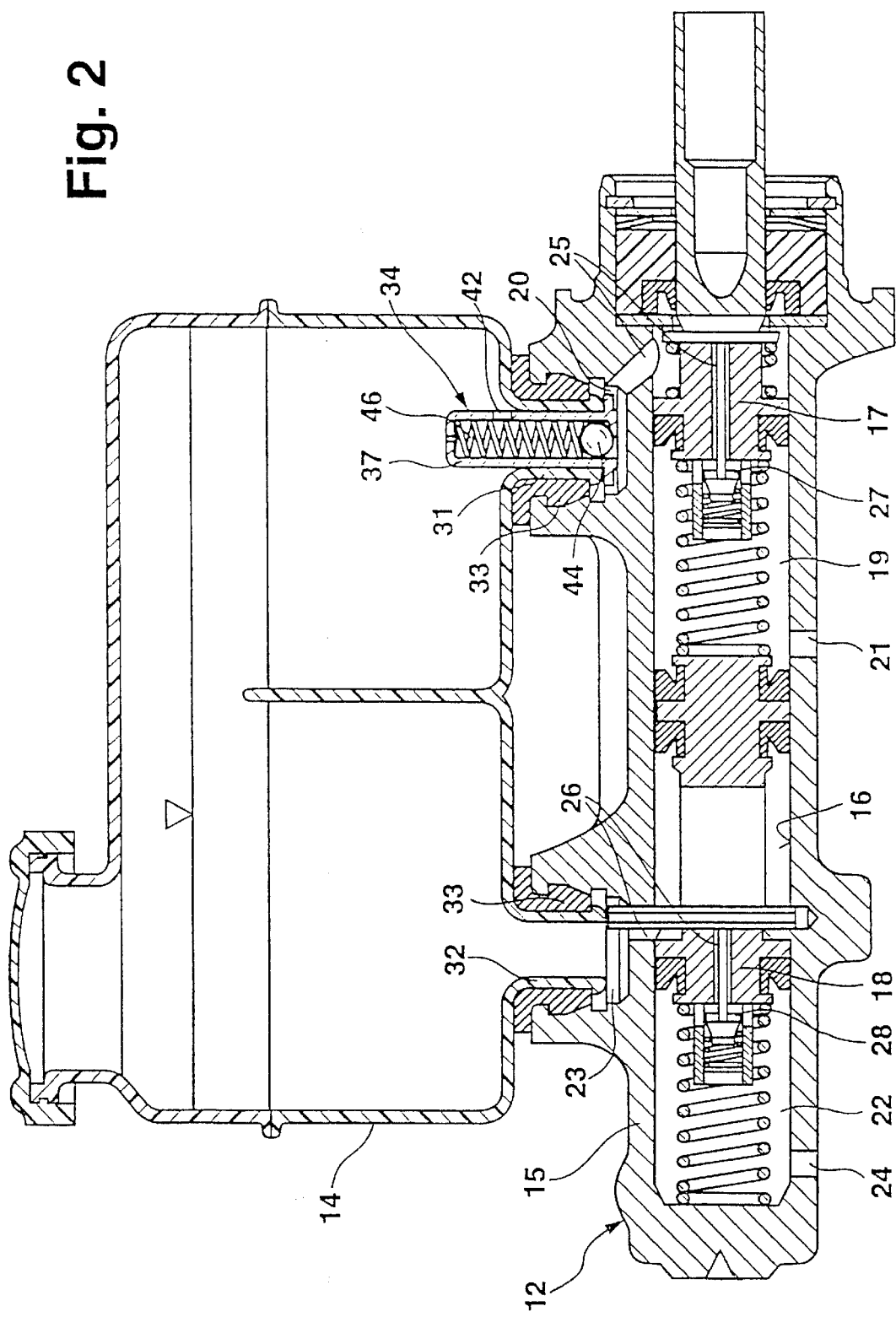
FIG. 2 is a longitudinal section through a master cylinder with the supply container in the vehicle brake system, with a valve means operatively disposed between a pressure chamber of the master cylinder and the supply container.

The vehicle brake system 10 has a dual-circuit master cylinder 12, actuatable by a brake pedal 11, with a brake booster 13 and a pressure fluid supply container 14 mounted on the master cylinder. The master cylinder 12 has a housing 15, FIG. 2 with a bore 16, in which a first piston 17, which can be displaced as a function of the depression of the brake pedal 11, and a second piston 18, on the side of the first piston away from the brake pedal, are received (FIG. 2). Located between the first piston 17 and the second piston 18 is a first pressure chamber 19, which communicates both with a first connection 20 embodied on the housing 15 of the master cylinder 12 and a second connection 21. Adjoining the second piston 18, on the side thereof away from the first pressure chamber 19, the master cylinder 12 has a second pressure chamber 22, with a third connection 23 embodied on the housing 15 and with a fourth connection 24. When the brake pedal 11 is not actuated, hydraulic communication exists between the first connection 20 and the second connection 21, because of a passage 25 in the housing 15 of the master cylinder 12 and in the first piston 17. Correspondingly, when the brake pedal 11 is not actuated, a hydraulic communication exists between the third connection 23 and the fourth connection 24 because of the passage 26 in the housing 15 and the second piston 18. When the brake pedal 11 is depressed, conversely, there is no hydraulic communication between the first connection 20 and the second connection 21, or between the third connection 23 and the fourth connection 24, because of a central valve 27 and 28, respectively, that block the passage 25 and 26 in the respective piston 17 and 18. The master cylinder 12 is of the type available on the market, and its function is known.

The pressure fluid supply container 14 has a first stub 31 and a second stub 32. The first stub 31 of the supply container 14 fits into the first connection 20 of the master cylinder 12; the second stub 32 is associated with the third connection 23 of the master cylinder. Sealing elements 33 seal off the two stubs 31 and 32 of the supply container 14 from the housing 15 of the master cylinder 12 and secure the supply container from being pulled off the master cylinder. While the second stub 32 of the supply container 14 discharges freely into the third connection 23 of the master cylinder 12, a valve means 34 embodied as a pressure valve is located in the first stub 31 of the supply container, and by means of this valve in automatic braking the flow through the first pressure chamber 19 of the master cylinder 12 to the supply container 14 can at least be hindered, as will be described in further detail hereinafter.

The valve means 34 has a cartridge like housing 37, with which it is inserted fittingly, that is, so that it is sealed off circumferentially, from below into the first stub 31 of the pressure fluid supply container 14. The housing 37 is axially braced on the first stub 31 by a flange 38, FIG. 3. The valve means 34, in its housing 37, has a substantially cylindrical bore 39, which is bounded (FIG. 3) by a bottom 40 of the housing. While the bottom 40 of the housing 37 is located inside the pressure fluid supply container 14, the orifice 41 of the bore 39 is located in the first connection 20 of the master cylinder 12. The bore 39 therefore communicates toward the orifice with the first pressure chamber 19 of the master cylinder 12. Away from the orifice, that is, approximately halfway along the length of the bore, the housing 37 is provided with an overflow opening 42, which is located inside the pressure fluid supply container 14. The overflow opening 42 provides a hydraulic connection between the bore 39 of the housing 37 and the supply container 14. A compensation opening 43 of small cross section is also provided in the bottom 40 of the housing 37. Toward the orifice, there is a ball-shaped valve member 44 in the bore 39, which is prevented from escaping from the housing 37 by a stop 45. The bore 39 also receives a valve spring 46, in the form of a helical compression spring. This spring is braced with prestressing on the valve member 44 on one end and on the bottom 40 of the housing 37 on the other. The valve member 44 and the cylindrical bore 39 of the housing are adapted to one another in such a way that a throttling cross section 47 is located between the valve member and the housing. This throttling cross section 47 is smaller in area than the cross section of the overflow opening 42. The valve member 44 is movable in the direction toward the bottom 40 of the housing 37 counter to the force of the valve spring 47. In a partial stroke that begins at the position shown, the valve member 44 controls the throttling cross section 47. In a residual stroke, the valve member 44 conversely uncovers the overflow opening 42.

Figure 3:
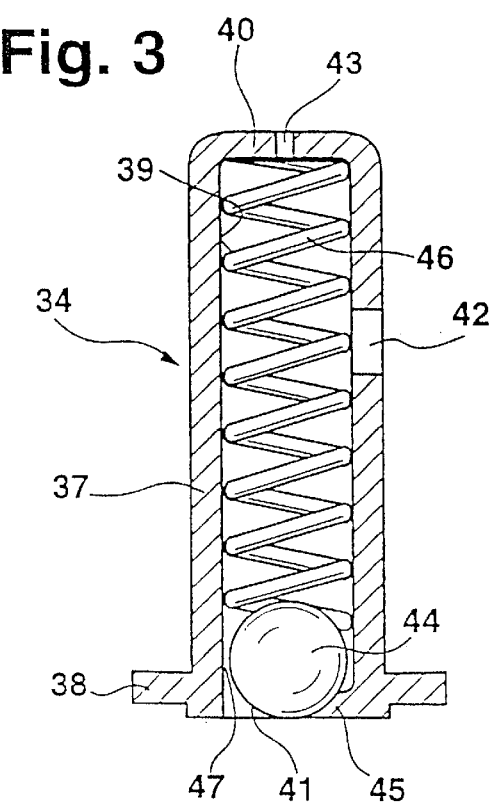
FIGS. 3–6 show various version of the valve means in section, on a larger scale.
Figure 4:
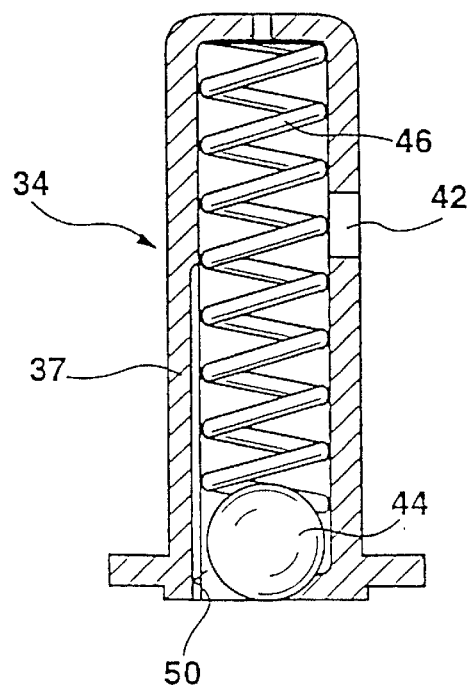
Figure 5:
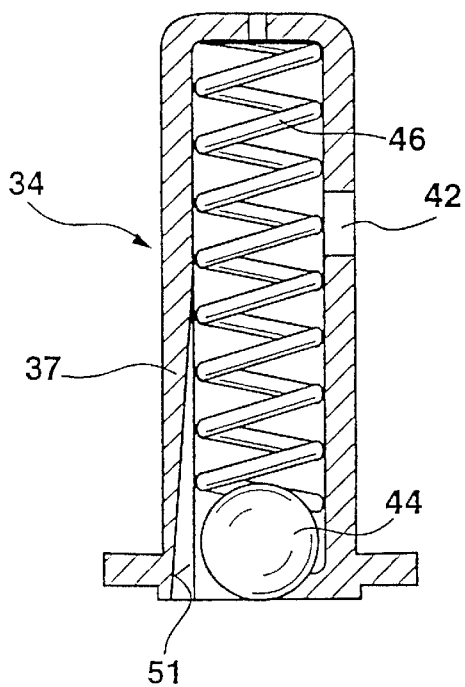

In the version of the valve means 34 of FIG. 3, the throttling cross section 47 is formed by a different diameter of the valve member 44 and bore 39 of the housing 37. In the other versions for the valve means 34 shown in FIGS. 4-6, the bore 39 of the housing 37 is provided, between the orifice 41 and the overflow opening 42, with a cross-sectional deviation that forms the throttling cross section 47. In the version of FIG. 4, the cross-sectional deviation comprises a longitudinally extending groove 50 of the same cross section. In the version of FIG. 5, conversely, the cross-sectional deviation is formed by a longitudinally extending groove 51 whose cross section narrows toward the bottom 40 of the housing 37.

Figure 6:
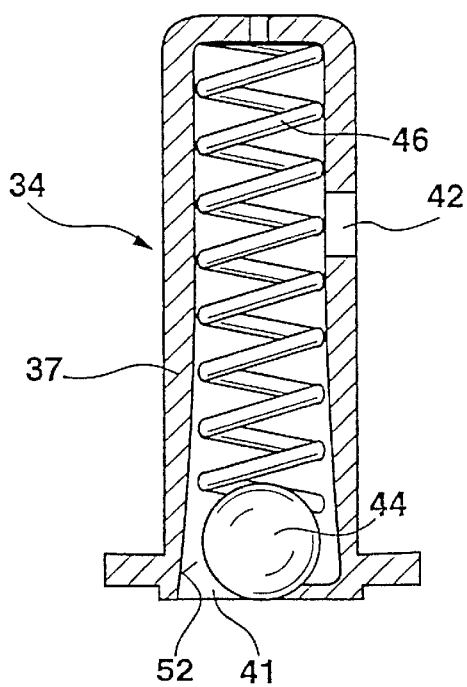

In the version of FIG. 6, the cross-sectional deviation comprises a bore portion 52 that widens conically toward the orifice 41. In all three versions of FIGS. 4-6, in contrast to the version of FIG. 3, the spherical valve member 44 has a diameter that is virtually equal to the diameter of the cylindrical bore 39 of the housing 37.

A first brake line 55 of a brake circuit I originates at the second connection 21 of the master cylinder 12 and leads to groups of vehicle wheels assigned to wheel brake cylinders 56 and 57. Each of the wheel brake cylinders 56 and 57 is assigned a respective valve assembly 58 and 59 for brake pressure modulation in the wheel brake cylinders. The valve assemblies 58 and 59 each have one brake pressure buildup valve 60 and one brake pressure reduction valve 61. Located between the valve assemblies 58 and 59, respectively, and the second connection 21 of the master cylinder 12 in the first brake line 55 is a blocking valve 62 with a pressure limiting function in its blocking position. A return line 63 originates at the brake pressure reduction valves 61 of the valve assemblies 58 and 59, and a high-pressure pump 64 is disposed in this line. The return line 63 is connected to the first brake line 55 between the valve assemblies 58 and 59 and the blocking valve 62. A multiway valve 65 is also provided, which is located in a suction line 66. By means of connection, toward the master cylinder, with the first brake line 55, this suction line communicates with the second connection 21 of the master cylinder 12 and leads on the inside take of the high-pressure pump 64 to the return line 63.

A second brake line 69 of a second brake circuit II is connected to the fourth connection 24 of the master cylinder 12 and communicates with a group of wheel brake cylinders 70 and 71. The brake circuit II is embodied identically to the brake circuit I. It has valve assemblies 72 and 73, assigned to the wheel brake cylinders 70 and 71, respectively, for brake pressure regulation, as well as a blocking valve 74 with pressure limiting function, a high-pressure pump 75, and a multiway valve 76, as well as both a return line 77 and a suction line 78. The two high-pressure pumps 64 and 75 of the two brake circuits I and II can be driven by the same electric motor 79. The valves, lines, pumps and motor mentioned are all part of a structural unit, known as a hydraulic unit 80, of the brake system 10, as represented by the dot-dashed outline in FIG. 1.

As a further component unit of the hydraulic vehicle brake system 10, a pump device 83 is provided, which has a low-pressure pump 84 with an electric drive motor 85. A suction connection 86 of the pump 84 is connected by a suction line 87 to the pressure fluid supply container 14. A pressure line 89 originating at a pressure connection 88 of the pump 84 is connected to the first brake line 55 of the brake circuit I and thus is in hydraulic communication with the second connection 21 of the master cylinder 12. A check valve 90 which allows a flow toward the first brake line 55 is located in the pressure line 89.

The hydraulic vehicle brake system 10 also includes an electronic control unit 93 for controlling the function of the brake system in automatic braking and in the anti-lock or traction control modes. Wheel rotation sensors 94, 95, 96 and 97 assigned to the individual vehicle wheels are connected to the control unit 93. Other sensors connected to the control unit 93 are represented by the symbol 98. These sensors detect the steering wheel angle, the yaw speed and transverse acceleration of the vehicle, for instance, as well as the pressure in the first brake line 55 toward the master cylinder. The control unit 93 also communicates with a pedal switch 99 that detects an actuation of the brake pedal 11. Finally, the control unit 93 is also embodied for switching the valves, combined in the hydraulic unit 80, and for controlling the pump drive motors.

The mode of operation of the hydraulic vehicle brake system 10 is briefly as follows:

In braking operations by pedal actuation where there is no danger of wheel locking, the valves 60 and 61 of the valve assemblies 58, 59, 72, 73 for the brake pressure modulation, the blocking valves 62, 74, and the multiway valves 65, 76 of the two brake circuits I and II all remain in the position shown, and the pumps 64, 75, 84 are not put into operation. Pressure generated in the master cylinder 12 is fed through the brake lines 55 and 69 into the wheel brake cylinders 56, 57, 70, 71. During this driver-actuated braking, the check valve 90 prevents a loss of brake fluid from brake circuit I through the low-pressure pump 84 to the supply container 14 of the master cylinder 12. In driver-actuated braking when there is a danger of wheel locking, the vehicle wheel subjected to excessively high brake slip is stabilized in that the control unit 93 modulates the brake pressure in the wheel brake cylinder assigned to the affected wheel by switching the valves 60 and 61 of the associated valve assembly for brake pressure modulation into phases for pressure reduction, pressure holding and pressure buildup. The drive motor 79 of the high-pressure pumps 64 and 75 is put into operation by the control unit 93. If more than one wheel is threatening to lock, then the anti-lock control is performed at each of the wheel brake cylinders assigned to the vehicle wheels.

In traction control, which like the dynamic drive control described hereinafter is an automatic braking mode, the vehicle wheel subject to excessively high slip is stabilized by feeding brake pressure into the associated wheel brake cylinder. To that end, the control unit 93 turns on both the low-pressure pump 84 and the high-pressure pumps 64 and 75. For instance, if the vehicle wheel assigned to the wheel brake cylinder 56 in brake circuit I is the wheel that requires stabilization, then the control unit 93 switches the blocking valve 62 and the brake pressure buildup valve 60 of the valve assembly 59 into the blocking position, while the multiway valve 65 is switched to the open position. The low-pressure pump 84 draws brake fluid from the supply container 14 and pumps it into the first brake line 55. The pumped brake fluid reaches the suction line 66 on the one hand and, through the second connection 21 of the master cylinder 12, its first pressure chamber 19 on the other. Since with the brake pedal 11 not actuated the central valve 27 in the first piston 17 is open, and therefore the passage 25 to the first connection 20 of the master cylinder 12 is available for the pumped pressure fluid, the valve means 34 upon the outflow of pressure fluid from the first pressure chamber 19 into the supply container 14 becomes operative in such a way that a head pressure builds up upstream of the throttling cross section 471 and this pressure causes a rise in the pumping pressure of the low-pressure pump 84 to a pressure level predetermined by the design of the valve means 34. This pressure level is variable within limits during the partial stroke of the valve member 44 in the valve means 34 because of the design of the valve spring 46 and the embodiment of the cross-sectional deviations of the cylindrical bores 39 of the housing 37. The pressure furnished by the low-pressure pump 84 is limited, however, for instance at a level of 20 bar, by providing that the valve member 44 reaches the overflow opening 42 counter to the resistance of the valve spring 46 and uncovers its cross section, bypassing the throttling cross section 47 for the outflow of pressure fluid into the supply container 14. Thus the valve means 34 also performs a pressure limiting function for the low-pressure pump 84.

The pumping pressure of the low-pressure pump 84, which is set by the action of the valve needle 34, becomes operative at the suction inlet of the high-pressure pump 64 as well, through the suction line 66, and thus improves the filling of this pump, especially at low ambient temperatures. The pressure fluid furnished by the high-pressure pump 64 generates a braking pressure in the wheel brake cylinder 56 that is modulated, with the aid of the valve assembly 58, in order to stabilize the associated vehicle wheel.

The pressure made available by the low-pressure pump 84, which as charge pressure improves the filling of the high-pressure pump 64 as described above and speed up automatic braking engagement, causes a displacement of the second piston 18 in the master cylinder 12, so that this piston, after the closure of its central valve 28, generates a pressure in the second pressure chamber 22 that becomes operative in the brake circuit II. If as in this example none of the vehicle wheels assigned to brake circuit II is subject to excessively high drive slip, then the control unit 93 switches at least the blocking valve 74 into the blocking position, to prevent the application of the wheel brakes. Conversely, if in brake circuit II as well at least one vehicle wheel is affected by excessively high drive slip, then the pressure generated indirectly by the low-pressure pump 84 in the second pressure chamber 22 of the master cylinder 12 is utilized, by suitable valve switching, for filling the high-pressure pump 75 of the brake circuit II with pressure fluid.

If there is a risk of wheel spinning, with or without pedal actuation, a risk that is detected by the control unit 93 with the aid of the signals of the wheel rotation sensors 94, 95, 96, 97, the steering wheel angle sensor 98, the yaw speed sensor 98 and the transverse acceleration sensor 98, the vehicle brake system 10 is capable of stabilizing vehicle motion (dynamic drive control) by individual-wheel automatic brake engagement that is independent of the driver. By purposeful brake pressure buildup or reduction, influence is exerted on brake slip and thus on the lateral guide forces on the corresponding vehicle wheels, that the risk of wheel spinning is lessened, or wheel spinning that may have started is stopped.

The brake pressure required for this is furnished, as in the traction control mode, by the high-pressure pumps 64 and/or 75 in cooperation with the low-pressure pump 84.

The foregoing relates to a preferred exemplary embodiment of the invention, it being understood that other variants and embodiments thereof are possible within the spirit and scope of the invention, the latter being defined by the appended claims.

The foregoing relates to a preferred exemplary embodiment of the invention, it being understood that other variants and embodiments thereof are possible within the spirit and scope of the invention, the latter being defined by the appended claims.

What is claim is:

1. A hydraulic vehicle brake system (10) for braking by brake pedal actuation and for automatic braking, which comprises a master cylinder (12), which has a housing (15), a bore (16) in the housing and a first displaceable piston (17) in the bore, the first piston being displaceable as a function of a depression of a brake pedal (11); a second piston (18) on a side of the first piston (17) away from the brake pedal (11); a first pressure chamber (19), between the first and second piston (17, 18), which communicates with a first connection (20) of the master cylinder, embodied on the housing (15), and a second connection (21); and, adjoining the second piston (18) on a side away from the first pressure chamber (19), a second pressure chamber (22) of the master cylinder with a third connection (23), embodied on the housing (15), and a fourth connection (24), wherein when the brake pedal (11) is depressed, there is no hydraulic communication between the first and second connections (20, 21) or between the third and fourth connections (23, 24);

a supply container (14) for pressure fluid, wherein the supply container (14) is assigned to the first and third connections (20, 23) of the master cylinder (12);

a valve means (34), disposed in a region of the first connection (20) of the master cylinder (12), by means of which upon automatic braking a pressure of the pressure fluid on flowing through the first pressure chamber (19) to the supply container (14) is limited;

a pump (84), which has a suction connection (86), communicating with the supply container (14), and a pressure connection (88), communicating with the second connection (21) of the master cylinder (12), for aspirating pressure fluid from the supply container (14) and pumping the fluid to the second connection (21) of the master cylinder (12);

a first brake circuit (I) connected to the second connection (21) of the master cylinder (12), and a second brake circuit (II), connected to the fourth connection (24) of the master cylinder (12), wherein each brake circuit (I, II) has a plurality of wheels associated with wheel brake cylinders (56, 57, 70, 71), and valve assemblies (58, 59, 72, 73) for brake pressure modulation in the wheel brake cylinders (56, 57, 70, 71);

a control unit (93) for performing automatic braking operation with an activation of the pump (84), the valve means (34) is actuatable by the pressure of the pump (84) upon automatic braking, and at low pump pressure throttles the flow through the first pressure chamber (19) of the master cylinder (12) to the supply container (14) for pressure fluid and, at a pump pressure elevated with respect thereto limits this pressure, in which the pump (84) is embodied as a low-pressure pump;

that the valve assemblies (58, 59, 72, 73) for the brake pressure modulation in both brake circuits (I, II) are each assigned one high-pressure pump (64, 75);

that in a brake circuit (I) the high-pressure pump (64) is connected on an intake side, through a multiway valve (65), to the second connection (21) of the master cylinder (12), and in the circuit (II) the high-pressure pump (75) is connected on the intake side through a multiway valve (76) to the fourth connection (24) of the master cylinder (12);

and that when the brake pedal (11) is not actuated, in automatic braking operation, the low-pressure pump (84) furnishes charge pressure to the high-pressure pumps (64, 75).

2. The hydraulic vehicle brake system according to claim 1, in which
the valve means (34) has a valve member (44), disposed in a housing (37), said valve member is supported on a valve spring (46) and in a partial stroke controls a throttling cross section (47) in parallel with the valve member and in a residual stroke uncovers an overflow opening (42).

3. The hydraulic vehicle brake system according to claim 2, in which
the valve means (34), in its housing (37), has a substantially cylindrical bore (39) with a bottom (40) and an orifice (41) oriented toward the first connection (20) of the master cylinder (12);
that the valve spring (46) formed as a helical compression spring, and the valve member (44) formed as a spherical ball are received in the bore (39);
and that the bore (39), remote from the orifice, communicates with the overflow opening (42).

4. The hydraulic vehicle brake system according to claim 3, in which
the bore (39) of the housing (37), between the orifice (41) and the overflow opening (42), has a cross-sectional deviation which is formed by a longitudinally extending groove (50, 51) of constant cross section.

5. The hydraulic vehicle brake system according to claim 3, in which
the bore (39) of the housing (37), between the orifice (41) and the overflow opening (42), has a cross-sectional deviation which is formed by a longitudinally extending groove of decreasing cross section toward the bottom (40).

6. The hydraulic vehicle brake system according to claim 3, in which
the bore (39) of the housing (37), between the orifice (41) and the overflow opening (42), has a cross-sectional deviation which is formed by a longitudinally extending groove having a bore segment (52) that widens conically toward the orifice (41).

7. The hydraulic vehicle brake system according to claim 3, in which
the housing (37) of the valve means (34) has a cartridge like housing and is introduced into the first connection (20) of the master cylinder (12), and the orifice (41) of the bore (39) is associated with the first pressure chamber (19) of the master cylinder (12), and the overflow opening (42) is associated with the supply container (14) for pressure fluid.

8. The hydraulic vehicle brake system according to claim 7, in which
the valve means (34) is inserted fittingly into a stub (31) of the supply container (14) for pressure fluid, which stub fits into the first connection (20) of the master cylinder (12).

* * * * *

UNITED STATES PATENT AND TRADEMARK OFFICE
CERTIFICATE OF CORRECTION

PATENT NO.      : 6,290,306 B1
DATED           : September 18, 2001
INVENTOR(S)     : Micheal Friedow It is certified that error appears in the above-identified patent and that said Letters Patent is hereby corrected as shown below:

<u>Title page,</u>
Item [54], should read as follows:

-- [54] HYDRAULIC VEHICLE BRAKE SYSTEM FOR A VEHICLE --

Signed and Sealed this

Ninth Day of April, 2002

*Attest:*

*Attesting Officer*

JAMES E. ROGAN
*Director of the United States Patent and Trademark Office*